(12) United States Patent
Welch

(10) Patent No.: US 10,341,040 B2
(45) Date of Patent: *Jul. 2, 2019

(54) METHOD AND SYSTEM FOR A POLARIZATION IMMUNE WAVELENGTH DIVISION MULTIPLEXING DEMULTIPLEXER

(71) Applicant: Luxtera, Inc., Carlsbad, CA (US)

(72) Inventor: Brian Welch, San Diego, CA (US)

(73) Assignee: Luxtera, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/805,803

(22) Filed: Nov. 7, 2017

(65) Prior Publication Data

US 2018/0069649 A1 Mar. 8, 2018

Related U.S. Application Data

(63) Continuation of application No. 15/436,200, filed on Feb. 17, 2017, now Pat. No. 9,825,727, which is a
(Continued)

(51) Int. Cl.
*H04B 10/40* (2013.01)
*H04B 10/80* (2013.01)
(Continued)

(52) U.S. Cl.
CPC ...... *H04J 14/0221* (2013.01); *G02B 6/12007* (2013.01); *G02B 6/1225* (2013.01);
(Continued)

(58) Field of Classification Search
CPC .............. G02B 6/12007; G02B 6/1225; G02B 6/2773; G02B 6/29353; G02B 6/2938;
(Continued)

(56) References Cited

U.S. PATENT DOCUMENTS 5,754,941 A * 5/1998 Sharpe .................. H04J 3/1617
348/E7.07
5,841,557 A * 11/1998 Otsuka ............... H04B 10/2557
398/65
(Continued)

*Primary Examiner* — Amritbir K Sandhu
(74) *Attorney, Agent, or Firm* — McAndrews, Held & Malloy

(57) ABSTRACT

Methods and systems for a polarization immune wavelength division multiplexing demultiplexer are disclosed and may include, in an optoelectronic transceiver having an input coupler, a demultiplexer, and an amplitude scrambler: receiving input optical signals via the input coupler, communicating the input optical signals to the amplitude scrambler via waveguides, configuring the average optical power in each of the waveguides utilizing the amplitude scrambler, and demultiplexing the optical signals utilizing the demultiplexer. The amplitude scrambler may include phase modulators and a coupling section. The phase modulators may include sections of P-N junctions in the two waveguides. The demultiplexer may include a Mach-Zehnder Interferometer. The demultiplexed signals may be received utilizing photodetectors. The input coupler may include a polarization splitting grating coupler. The average optical power may be configured above which demultiplexer control circuitry is able to control the demultiplexer to process incoming optical signals.

20 Claims, 8 Drawing Sheets

Related U.S. Application Data continuation of application No. 14/752,709, filed on Jun. 26, 2015, now Pat. No. 9,577,780.

(60) Provisional application No. 61/998,385, filed on Jun. 26, 2014.

(51) Int. Cl.

| | | |
|---|---|---|
| *H04J 14/02* | (2006.01) | |
| *H04B 10/516* | (2013.01) | |
| *G02B 6/27* | (2006.01) | |
| *G02B 6/34* | (2006.01) | |
| *G02B 6/42* | (2006.01) | |
| *G02B 6/122* | (2006.01) | |
| *G02B 6/293* | (2006.01) | |
| *G02F 1/025* | (2006.01) | |
| *G02F 1/225* | (2006.01) | |
| *G02B 6/12* | (2006.01) | |
| *G02F 1/21* | (2006.01) | |

(52) U.S. Cl.
CPC ......... *G02B 6/2773* (2013.01); *G02B 6/2786* (2013.01); *G02B 6/2938* (2013.01); *G02B 6/29353* (2013.01); *G02B 6/29397* (2013.01); *G02B 6/34* (2013.01); *G02B 6/4215* (2013.01); *G02F 1/025* (2013.01); *G02F 1/2257* (2013.01); *H04B 10/40* (2013.01); *H04B 10/5161* (2013.01); *H04B 10/801* (2013.01); *H04J 14/02* (2013.01); *G02B 6/29352* (2013.01); *G02B 6/29395* (2013.01); *G02F 1/225* (2013.01); *G02F 2001/212* (2013.01); *G02F 2203/06* (2013.01)

(58) Field of Classification Search
CPC ........................ G02B 6/29397; G02B 6/4215; G02B 6/2786; G02B 6/29352; G02B 6/29395; G02B 6/34; G02F 1/2257; G02F 2001/212; G02F 1/025; G02F 1/225; G02F 2203/06; H04B 10/40; H04B 10/5161; H04B 10/801; H04J 14/0221; H04J 14/02
USPC .............................................. 398/43, 82, 87
See application file for complete search history.

(56) References Cited

U.S. PATENT DOCUMENTS

| | | | | |
|---|---|---|---|---|
| 6,204,945 | B1* | 3/2001 | Iwata | H04B 10/506 |
| | | | | 398/9 |
| 6,266,456 | B1* | 7/2001 | Lee | G02B 6/2786 |
| | | | | 359/489.01 |
| 7,027,673 | B1 | 4/2006 | Gunn, III | |
| 9,331,096 | B2 | 5/2016 | Pinguet | |
| 9,541,775 | B2* | 1/2017 | Ayazi | G02F 1/025 |
| 9,825,727 | B2* | 11/2017 | Welch | H04J 14/02 |
| 10,128,957 | B2* | 11/2018 | Welch | H04B 10/516 |
| 2003/0210403 | A1* | 11/2003 | Luscombe | G01V 1/16 |
| | | | | 356/491 |
| 2007/0047866 | A1* | 3/2007 | Phua | G02B 6/274 |
| | | | | 385/11 |
| 2009/0022500 | A1 | 1/2009 | Pinguet | |
| 2009/0087196 | A1* | 4/2009 | Welch | H04L 25/0272 |
| | | | | 398/183 |
| 2009/0257755 | A1* | 10/2009 | Buelow | H04B 10/505 |
| | | | | 398/184 |
| 2010/0060972 | A1 | 3/2010 | Kucharski | |
| 2010/0128336 | A1 | 5/2010 | Witzens | |
| 2010/0329600 | A1* | 12/2010 | Sugiyama | G02B 6/29352 |
| | | | | 385/2 |
| 2011/0249971 | A1* | 10/2011 | Oda | H04B 10/2572 |
| | | | | 398/65 |
| 2011/0305414 | A1* | 12/2011 | Mekis | G02F 1/313 |
| | | | | 385/3 |
| 2012/0177381 | A1* | 7/2012 | Dobbelaere | H01L 21/84 |
| | | | | 398/139 |
| 2014/0010498 | A1 | 1/2014 | Verslegers | |
| 2014/0348460 | A1 | 11/2014 | Dorin | |
| 2015/0037044 | A1 | 2/2015 | Peterson | |
| 2015/0219847 | A1 | 8/2015 | Mack | |
| 2015/0286004 | A1 | 10/2015 | Mekis | |
| 2015/0378098 | A1* | 12/2015 | Matsumoto | G02B 6/1228 |
| | | | | 356/477 |
| 2015/0381273 | A1 | 12/2015 | Gloeckner | |
| 2016/0036550 | A1* | 2/2016 | Welch | H04J 14/02 |
| | | | | 398/87 |
| 2016/0036553 | A1* | 2/2016 | Zhao | H04J 14/0212 |
| | | | | 398/7 |
| 2016/0119057 | A1 | 4/2016 | Mekis | |
| 2016/0182151 | A1 | 6/2016 | Masini | |
| 2016/0282556 | A1* | 9/2016 | Park | G02B 6/12033 |
| 2017/0018907 | A1* | 1/2017 | Kobayashi | G02B 6/122 |
| 2017/0163369 | A1* | 6/2017 | Welch | G02B 6/4215 |
| 2018/0069649 | A1* | 3/2018 | Welch | H04J 14/02 |

\* cited by examiner

METHOD AND SYSTEM FOR A POLARIZATION IMMUNE WAVELENGTH DIVISION MULTIPLEXING DEMULTIPLEXER

CROSS-REFERENCE TO RELATED APPLICATIONS/INCORPORATION BY REFERENCE

This application is a continuation of U.S. application Ser. No. 15/436,200 filed on Feb. 17, 2017, which is a continuation of U.S. application Ser. No. 14/752,709 filed on Jun. 26, 2015, now U.S. Pat. No. 9,577,780, which claims priority to and the benefit of U.S. Provisional Application 61/998,385 filed on Jun. 26, 2014, which is hereby incorporated herein by reference in its entirety.

FIELD

Certain embodiments of the disclosure relate to semiconductor photonics. More specifically, certain embodiments of the disclosure relate to a method and system for a polarization immune wavelength division multiplexing demultiplexer.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for a polarization immune wavelength division multiplexing demultiplexer, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for a polarization immune wavelength division multiplexing demultiplexer. Exemplary aspects of the disclosure may comprise, in an optoelectronic transceiver having an input coupler, a demultiplexer, and an amplitude scrambler: receiving at least two input optical signals of different polarization via the input coupler, communicating the at least two input optical signals to the amplitude scrambler via two waveguides, configuring the average optical power in each of the two waveguides utilizing the amplitude scrambler, and demultiplexing the at least two optical signals utilizing the demultiplexer. The amplitude scrambler may comprise phase modulators and a coupling section. The phase modulators may comprise sections of P-N junctions in the two waveguides. The demultiplexer may comprise a Mach-Zehnder Interferometer. The demultiplexed signals may be received utilizing at least two photodetectors. The input coupler may comprise a polarization splitting grating coupler. The average optical power may be configured above a threshold value that is an optical power level above which demultiplexer control circuitry is able to control the demultiplexer to process incoming optical signals. The transceiver may comprise an optoelectronic transceiver in a silicon photonically-enabled integrated circuit. The silicon photonically-enabled integrated circuit may be in a single complementary-metal oxide semiconductor (CMOS) die. The silicon photonically-enabled integrated circuit may be in two CMOS die, where a first die comprises electronic devices and a second die comprises optical devices.

Figure 1A:
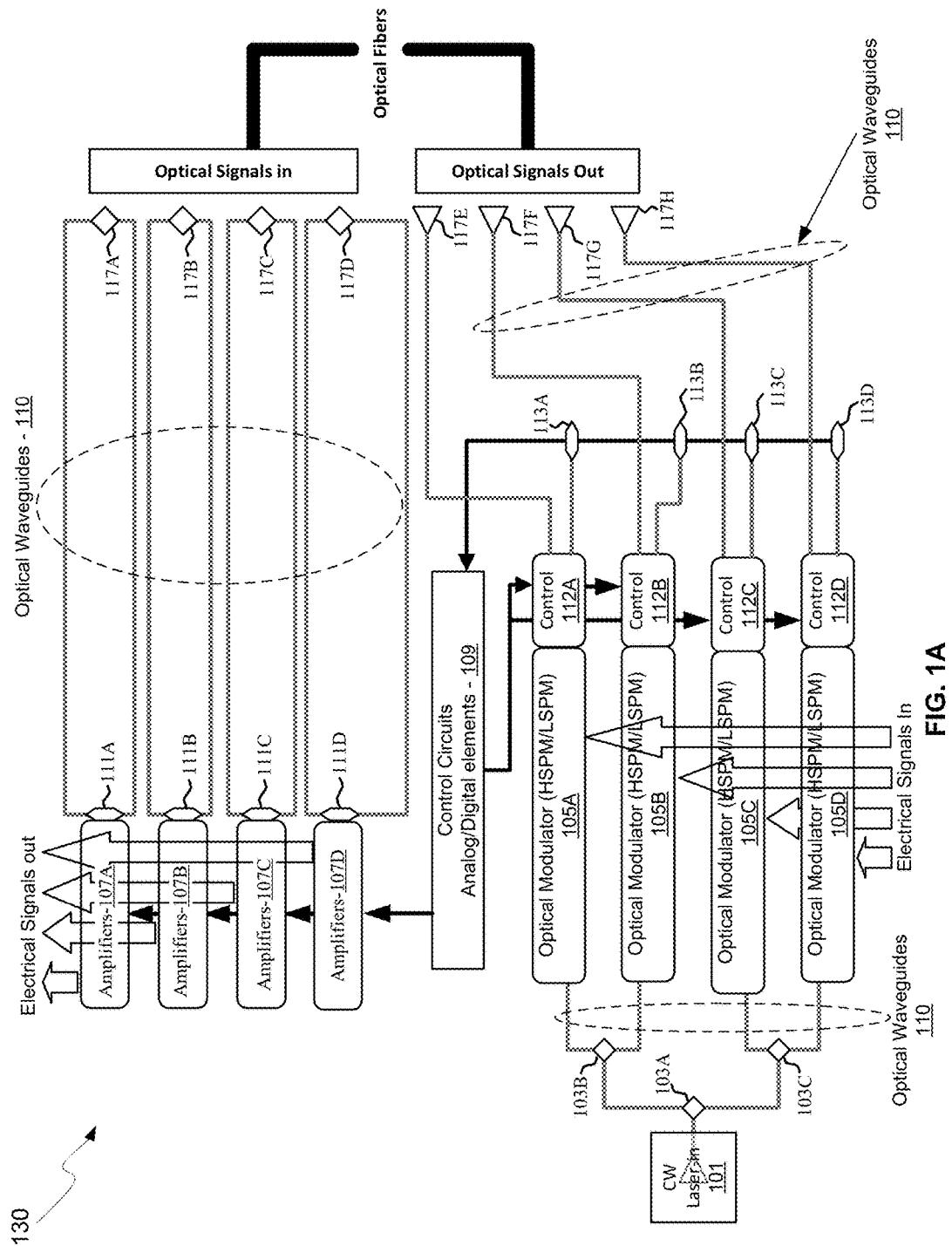
FIG. 1A is a block diagram of a photonically-enabled integrated circuit with amplitude scrambling demultiplexers, in accordance with an example embodiment of the disclosure.

FIG. 1A is a block diagram of a photonically-enabled integrated circuit with amplitude scrambling demultiplexers, in accordance with an example embodiment of the disclosure. Referring to FIG. 1A, there are shown optoelectronic devices on a photonically-enabled integrated circuit 130 comprising optical modulators 105A-105D, photodiodes 111A-111D, monitor photodiodes 113A-113D, and optical devices comprising couplers 103A-103C and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more continuous-wave (CW) optical signals to the coupler 103A. The photonically enabled integrated circuit 130 may comprise a single chip, or may be integrated on a plurality of die, such as with one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode. Such one mode may have, for example, a polarization that is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103D and 103C, which split the optical signal once more, resulting in tour roughly equal power optical signals.

The optical power splitter may comprise at least one input waveguide and at least two output waveguides. The couplers 103A-103C shown in FIG. 1A illustrate 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is carefully optimized.

One output of each of the optical modulators 105A-105D may be optically coupled via the waveguides 110 to the grating couplers 117E-117H. The other outputs of the optical modulators 105A-105D may be optically coupled to monitor photodiodes 113A-113D to provide a feedback path. The IC 130 may utilize waveguide based optical modulation and receiving functions. Accordingly, the receiver may employ an integrated waveguide photo-detector (PD), which may be implemented with epitaxial germanium/SiGe films deposited directly on silicon, for example.

The grating couplers 117A-117H may comprise optical gratings that enable coupling of light into and out of the photonically-enabled integrated circuit 130. The grating couplers 117A-1.17D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
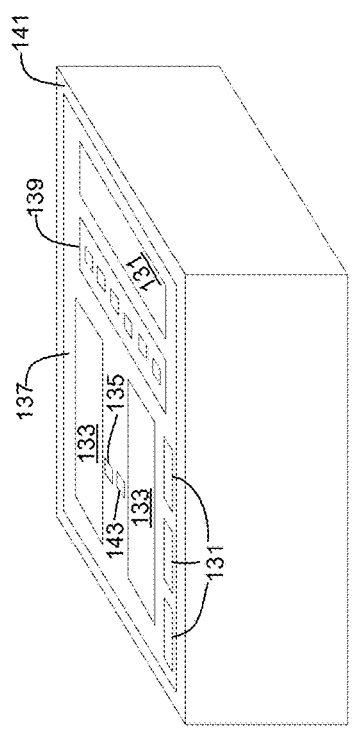
FIG. 1B is a diagram illustrating an exemplary photonically-enabled integrated circuit, in accordance with an example embodiment of the disclosure.
Figure 1B:
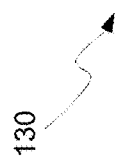

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enables modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

One of the most important commercial applications of silicon photonics is to make high speed optical transceivers, i.e., ICs that have optoelectronic transmission (Tx) and receiving (Rx) functionality integrated in the same chip. The input to such an IC is either a high speed electrical datastream that is encoded onto the Tx outputs of the chip by modulating the light from a laser or an optical data-stream that is received by integrated photo-detectors and converted into a suitable electrical signal by going through a Transimpedance Amplifier (TIA)/Limiting Amplifier (LA) chain. Such silicon photonics transceiver links operate at baudrates ranging from 10 Gbps to 28 Gbps.

In accordance with the disclosure, wavelength division multiplexing (WDM) is used to achieve high speed transceivers, where optical signals of multiple wavelengths are communicated over the same fiber. Multiplexers (Mux) and demultiplexers (demux) are utilized to combine and separate, respectively, the multiple wavelength optical signals at each end of the optical links. An actively controlled WDM demux utilizes a minimum constant power level to maintain bias. In one embodiment, an actively controlled WDM demux utilizes a minimum average power level over some time period to maintain constant bias. The "over some time period" may refer to the time constant of the demux control system and the average power level may vary within that time period above or below the control system average.

Figure 4:
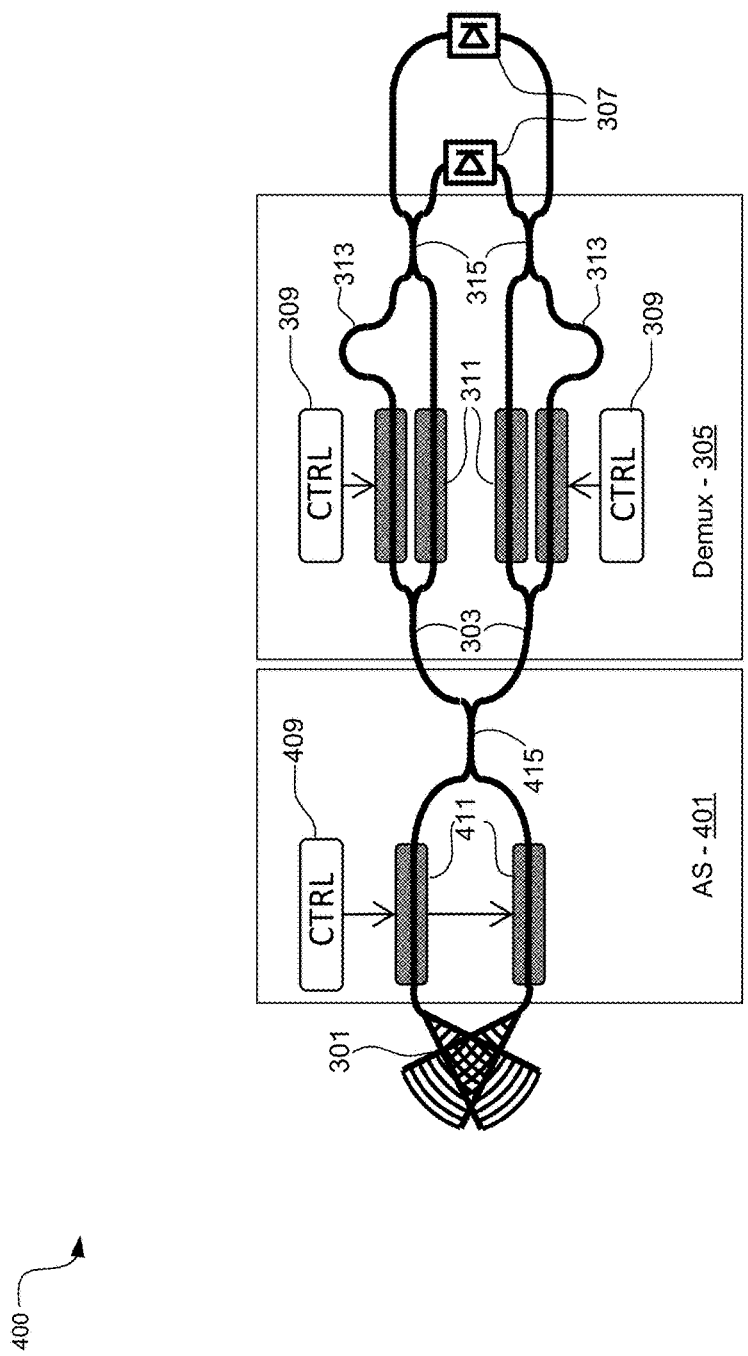
FIG. 4 illustrates a WDM demultiplexer with an amplitude scrambler, in accordance with an example embodiment of the disclosure.

In polarization splitting grating couplers, due to the often unknown polarization of the incoming optical signals, either branch may have near zero optical signal at some point. In an example scenario, polarizations from different branches may be combined to ensure constant signal amplitude into the WDM demux controller. In another example scenario, an amplitude scrambler may be utilized to ensure a minimum average optical power over time. For example, an MZI may be utilized to sweep the amplitude versus time, as shown in FIG. 4.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103C, optical terminations, grating couplers 117A-117H, optical modulators 105A-105D, high-speed heterojunction photodiodes 111A-111D, and monitor photodiodes 113A-113D.

In an example scenario, the optical and optoelectronic devices 133 may comprise demuxes for incoming WDM signals and the electronics devices/circuits 131 may comprise demux control circuitry.

Figure 1C:
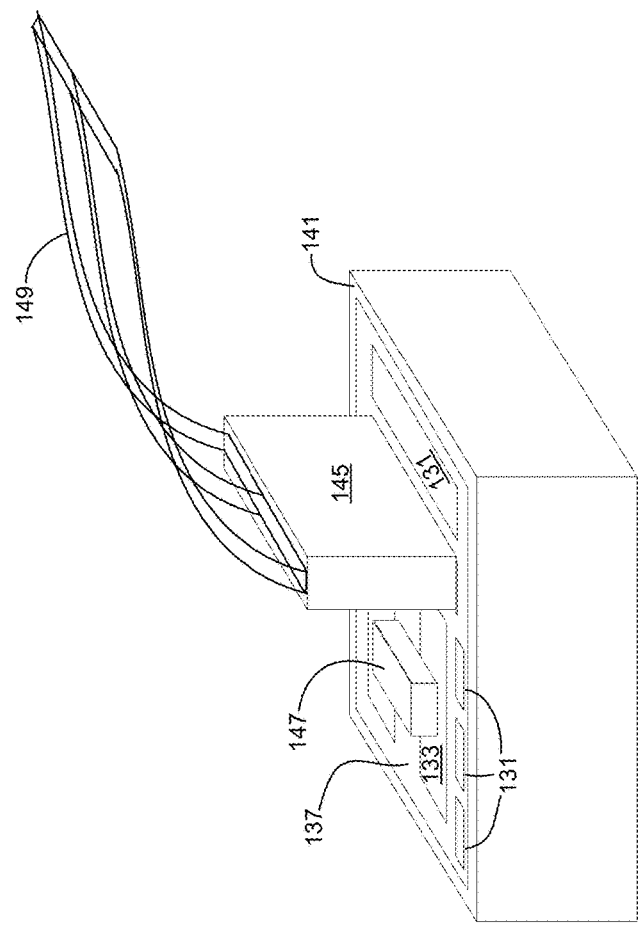
FIG. 1C is a diagram illustrating a photonically-enabled integrated circuit coupled to an optical fiber cable, in accordance with an example embodiment of the disclosure.
Figure 1C:
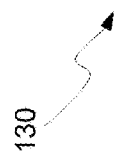

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137 and the CMOS guard ring 141. There are also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figure 2A:
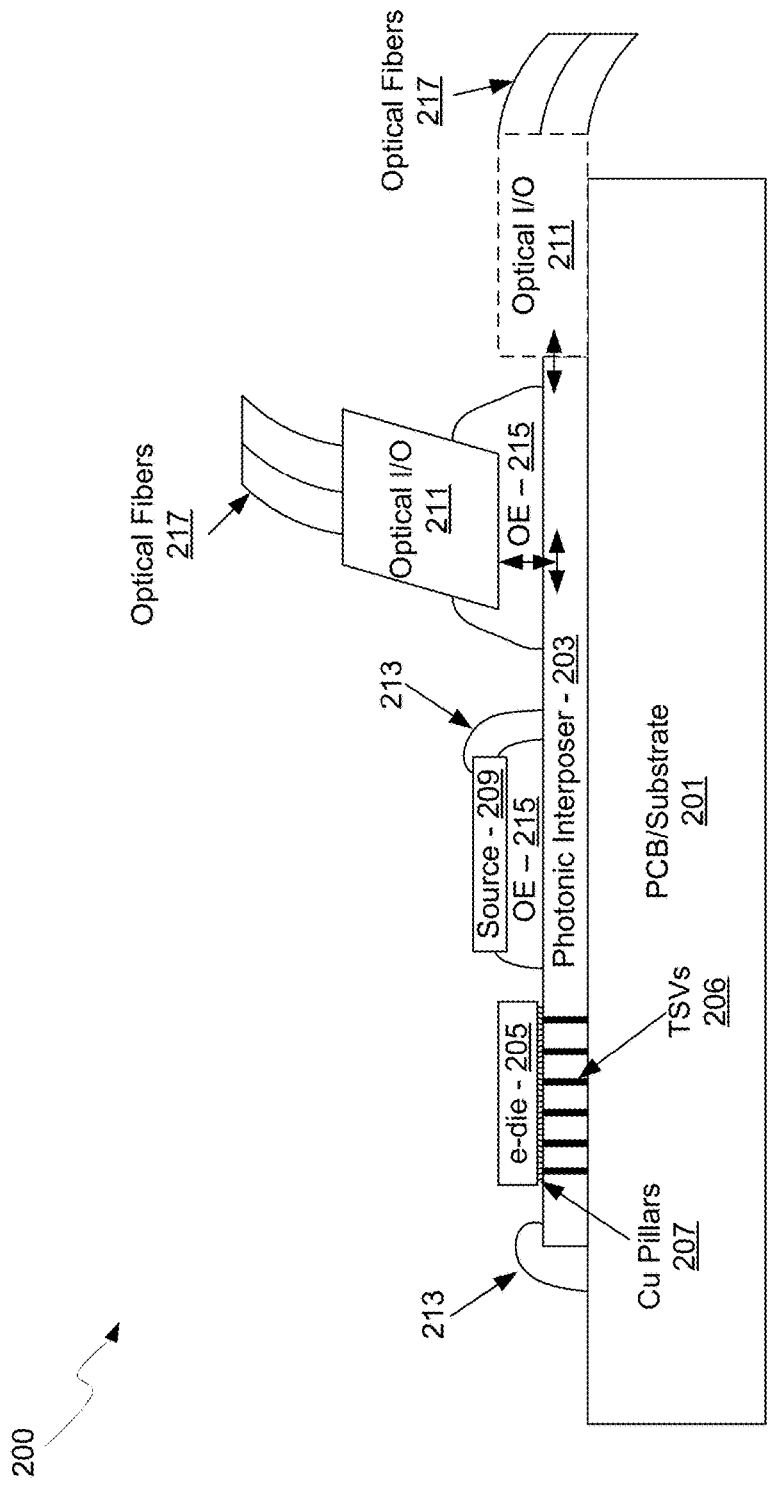
FIG. 2A is a schematic illustrating an exemplary optical transceiver including a photonic interposer, in accordance with an embodiment of the disclosure.

FIG. 2A is a schematic illustrating an exemplary optical transceiver including a photonic interposer, in accordance with an embodiment of the disclosure. Referring to FIG. 2A, there is shown a photonic transceiver 200 comprising a printed circuit board (PCB)/substrate 201, a silicon photonic interposer 203, an electronic CMOS die 205, through silicon vias (TSVs) 206, copper pillars 207, an optical source module 209, an optical input/output (I/O) 211, wire bonds 213, optical epoxy 215, and optical fibers 217.

The PCB/substrate 201 may comprise a support structure for the photonic transceiver 200, and may comprise both insulating and conductive material for isolating devices as well as providing electrical contact for active devices on the silicon photonic interposer 203 as well as to devices on the electronics die 205 via the silicon photonic interposer 203. In addition, the PCB/substrate may provide a thermally conductive path to carry away heat generated by devices and circuits in the electronics die 205 and the optical source module 209.

The silicon photonic interposer 203 may comprise a CMOS chip with active and passive optical devices such as waveguides, modulators, photodetectors, grating couplers, taps, and combiners, for example. The functionalities supported by the silicon photonic interposer 203 may comprise photo-detection, optical modulation, optical routing, and optical interfaces for high-speed I/O and optical power delivery.

The silicon photonic interposer 203 may also comprise copper pillars 207 for coupling the electronics die 205 to the silicon photonic interposer 203, as well as grating couplers for coupling light into the die from the optical source module 209 and into/out of the die via the optical I/O 211. In addition, the silicon photonic interposer 203 may comprise TSVs 206 for electrical interconnection through the die, such as between the PCB/substrate 201 and the electronics die 205. Optical interfaces may also be facilitated by the optical epoxy 215, providing both optical transparency and mechanical fixation.

The electronics die 205 may comprise one or more electronic CMOS chips that provide the required electronic functions of the photonic transceiver 200. The electronics die 205 may comprise a single chip or a plurality of die coupled to the silicon photonic interposer 203 via the copper pillars 207. The electronics die 205 may comprise TIA's, LNAs, and control circuits for processing optical signals in the photonics chip 203. For example, the electronics die 205 may comprise driver circuitry for controlling optical modulators in the silicon photonic interposer 203 and variable gain amplifiers for amplifying electrical signals received from photodetectors in the silicon photonic interposer 203. By incorporating photonics devices in the silicon photonic interposer 203 and electronic devices in the electronics die 205, the CMOS processes for each chip may be optimized for the type of devices incorporated.

The TSVs 206 may comprise electrically conductive paths that extend vertically through the silicon photonic interposer 203 and provide electrical connectivity between the electronics die 205 and the PCB/substrate 201. This may be utilized in place of wire bonds, such as the wire bonds 213, or in conjunction with wire bonds.

The copper pillars 207 may comprise linear or 2D arrays of metal pillars to provide electrical contact between the silicon photonic interposer 203 and the electronics die 205. For example, the copper pillars 207 may provide electrical contact between photodetectors in the silicon photonic interposer 203 and associated receiver circuitry in the electronics die 205. In addition, the copper pillars 207 may provide mechanical coupling of the electronics and photonics die, and may be encapsulated with underfill to protect the metal and other surfaces.

The optical source module 209 may comprise an assembly with an optical source, such as a semiconductor laser, and associated optical and electrical elements to direct one or more optical signals into the silicon photonic interposer 203. An example of the optical source module is described in U.S. patent application Ser. No. 12/500,465 filed on Jul. 9, 2009, which is hereby incorporated herein by reference in its entirety. In another exemplary scenario, the optical signal or signals from the optical source assembly 209 may be coupled into the silicon photonic interposer 203 via optical fibers affixed above grating couplers in the silicon photonic interposer 203.

The optical I/O 211 may comprise an assembly for coupling the optical fibers 217 to the silicon photonic interposer 203. Accordingly, the optical I/O 211 may comprise mechanical support for one or more optical fibers and an optical surface to be coupled to the silicon photonic interposer 203, such as by the optical epoxy 215. In another exemplary scenario, the optical I/O 211 may also be affixed along an edge of the silicon photonic interposer 203, as shown by the dashed line optical I/O 211, enabling the coupling of optical signals directly into optical waveguides as opposed to grating couplers on the surface of the silicon photonic interposer 203.

In operation, continuous-wave (CW) optical signals may be communicated into the silicon photonic interposer 203 from the optical source module 209 via one or more grating couplers in the silicon photonic interposer 203. Photonic devices in the silicon photonic interposer 203 may then process the received optical signal. For example, one or more optical modulators may modulate the CW signal based on electrical signals received from the electronics die 205. Electrical signals may be received from the electronics die 205 via the Cu pillars 207. By integrating modulators in the silicon photonic interposer 203 directly beneath the source of the electrical signals in the electronics die 205, signal path lengths may be minimized, resulting in very high speed performance. For example, utilizing ~20 micron Cu pillars with <20 fF capacitance, speeds of 50 GHz and higher can be achieved.

The modulated optical signals may then be communicated out of the silicon photonic interposer 203 via grating couplers situated beneath the optical I/O 211. In this manner, high-speed electrical signals generated in the electronics die 205 may be utilized to modulate a CW optical signal and subsequently communicated out of the silicon photonic interposer 203 via the optical fibers 217.

Similarly, modulated optical signals may be received in the silicon photonic interposer 203 via the optical fibers 217 and the optical I/O 211. The received optical signals may comprise WDM signals and may be received via PSGCs thereby communicating optical signals with different polarizations along different output waveguides within the silicon photonic interposer 203. An amplitude scrambler may be utilized to sweep the amplitude versus time in each waveguide to ensure a minimum average optical power over time.

The optical signals may be communicated via optical waveguides to one or more photodetectors integrated in the silicon photonic interposer 203. The photodetectors may be integrated in the silicon photonic interposer 203 such that they lie directly beneath the associated receiver electronics circuitry in the electronics die 205 when bonded and electrically coupled by the low parasitic capacitance Cu pillars 207.

The hybrid integration of CMOS electronics die on a silicon photonic interposer via Cu pillars enables very high speed optical transceivers utilizing CMOS processes. In addition, integrating separate photonic and electronic die enables the independent optimization of the performance of electronic and photonic functions within the respective CMOS processes. The electronic die, which is mounted by face-to-face bonding to the silicon photonic interposer, may contain electrical circuits that "drive" the photonic circuits on the interposer. Those circuits replace the electronic signaling drive circuits from conventional electrical interconnect solutions.

In addition, optical interconnect between multiple electronic die, i.e., chip-to-chip interconnect, is enabled by the silicon photonic interposer 203, where transceiver functions are supported by the combined electronic die and interposer and the associated optical routing on the silicon photonic interposer die 203. The disclosure is not limited to the arrangement shown in FIG. 2A. Accordingly, various other stacking arrangements are also possible. For example, photonic interposers may be sandwiched between electronic chips and stacks of interposers/electronic chips may be configured resulting in a 3-dimensional structure.

Figure 2B:
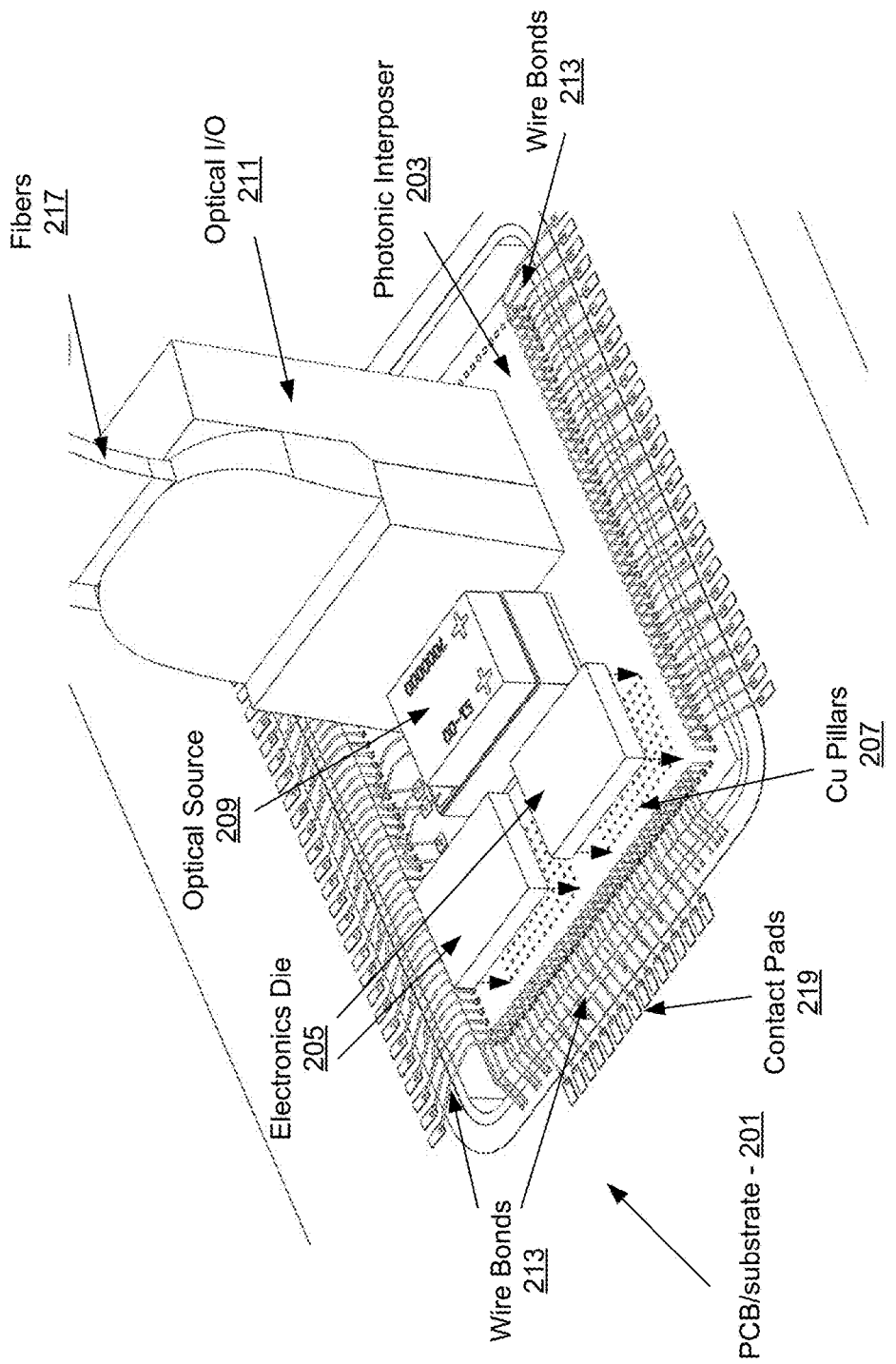
FIG. 2B is a perspective view of a hybrid integration photonic transceiver, in accordance with an embodiment of the disclosure.

FIG. 2B is a perspective view of a hybrid integration photonic transceiver, in accordance with an embodiment of the disclosure. Referring to FIG. 2B, there are shown the PCB/substrate 201, the silicon photonic interposer 203, electronics die 205, the Cu pillars 207, the optical source assembly 209, the optical I/o 211, wire bonds 213, optical fibers 217, and contact pads 219.

The electronics die 205 are shown prior to their bonding to the surface of the silicon photonic interposer 203 via the Cu pillars 207, as illustrated by the dashed arrows below each die. While two electronics die 205 are shown in FIG.

2B, it should be noted that the disclosure is not so limited. Accordingly, any number of electronics die may be coupled to the silicon photonic interposer 203 depending on, for example, the number of transceivers, the particular CMOS node utilized, thermal conductance, and space limitations, etc.

In another exemplary embodiment, the optical source assembly 209 may be located remotely and one or more optical fibers may be utilized to couple the optical source signal into the silicon photonic interposer 203 via grating couplers, for example.

In an exemplary embodiment, electronic functions may be integrated into the electronics die 205 and photonics circuitry may be integrated into the silicon photonic interposer 203 utilizing independent CMOS processes. The electronics die 205 may comprise electronic devices associated with photonic devices in the silicon photonic interposer 203, thereby minimizing electrical path lengths while still allowing independent performance optimization of electronic and photonic devices. For example, the CMOS processes that result in the highest electronics performance, such as the fastest switching speed, may not be optimum for CMOS photonics performance. Similarly, different technologies may be incorporated in the different die. For example, SiGe CMOS processes may be used for photonic devices such as photodetectors, and 32 nm CMOS processes may be used for electronic devices on the electronics die 205.

The silicon photonic interposer 203 may comprise photonic circuits, whereby optical signals may be received, processed, and transmitted out of the silicon photonic interposer 203. The optical source assembly 209 may provide a CW optical signal to the silicon photonic interposer 203, with the photonics circuitry in the silicon photonic interposer 203 processing the CW signal. For example, the CW signal may be coupled into the silicon photonic interposer 203 via grating couplers, communicated to various locations on the die via optical waveguides, modulated by Mach-Zehnder interferometer (MZI) modulators, and communicated out of the silicon photonic interposer 203 into optical fibers. In this manner, the hybrid integration of a plurality of high performance optical transceivers is enabled in CMOS processes.

In another exemplary scenario, the silicon photonic interposer 203 may provide optical routing between electronics die. For example, the electronics die 205 may comprise a plurality of processors and memory die. Electrical signals from the electronics die 205 may be communicated to modulators on the silicon photonic interposer 203 via copper pillars, for example, and converted to optical signals for routing to another electronics die via optical waveguides before being converted back to electronic signals utilizing photodetectors. In this manner, very high-speed coupling is enabled for a plurality of electronics die, reducing the memory requirements on processor chips, for example.

The utilization of optical signals for interconnecting electronics die enables very dense and low power interconnects, since no controlled impedance lines are necessary. Furthermore, costs may be reduced with integration on a photonics-only die since there is thus no power dissipation die in the interposer, and the electronics die may be heat sinked with conventional methods.

An amplitude scrambler may be utilized to ensure a minimum average optical power over time for the demux controllers. The splitting does not need to be equivalent between output arms as the light may be recombined at the receiver photodetectors.

Figure 3:
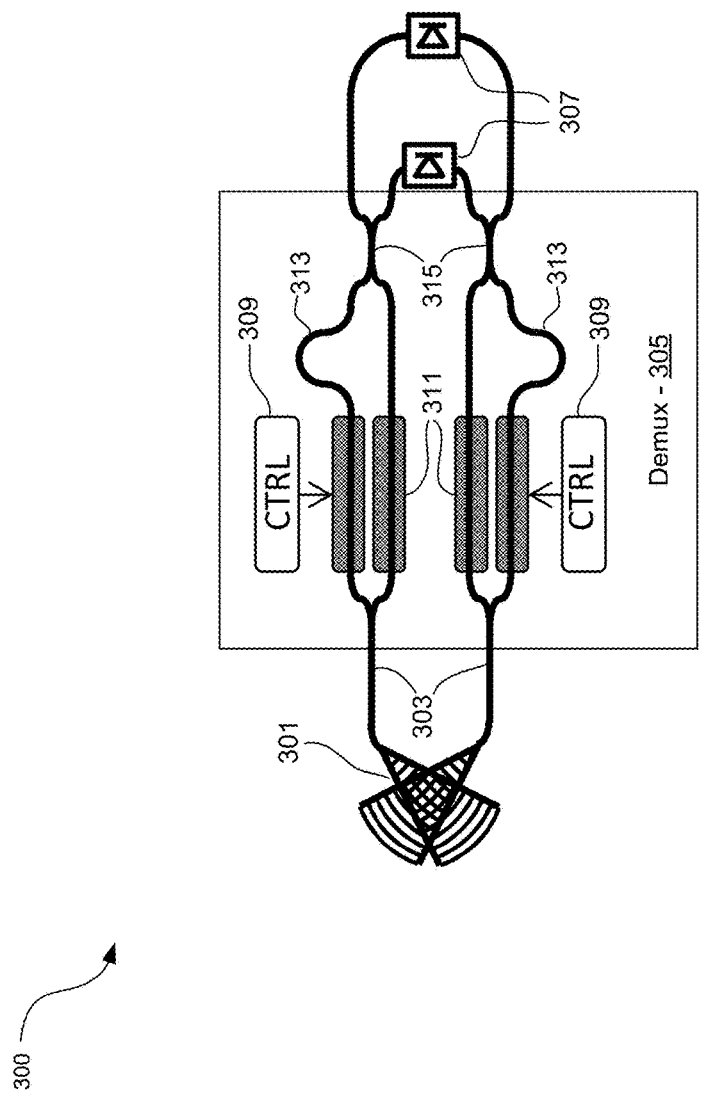
FIG. 3 illustrates a WDM demultiplexer, in accordance with an example embodiment of the disclosure.

FIG. 3 illustrates a WDM demux, in accordance with an example embodiment of the disclosure. Referring to FIG. 3, there are shown a polarization splitting grating coupler 301, optical waveguides 303, a demux 305, and photodetectors 307. The demux 305 may comprise control modules 309, phase modulators 311, chicanes 313, and coupling sections 315.

The waveguides 303 may comprise optical waveguides of different dielectric constant material for confining one or more optical modes for communication within the photonic IC and in this instance may extend from the PSGC 301 to the photodetectors 307. The photodetectors 307 may comprise photodiodes that are operable to receive optical signals and generate electrical output signals. In an example scenario, the photodetectors 307 comprise silicon and germanium materials and may be operable to receive a different wavelength used in the WDM system.

The control modules 309 may comprise suitable circuitry, logic, and/or code that may be operable to communicate control signals to the phase modulators 309. In addition the control modules 309 may receive demux output signals represented by electrical signals generated by the photodetectors 307.

The phase modulators 311 may comprise sections of p-n junctions in the waveguides 303 such that the phase of optical signals may be modulated by changing the bias on the phase modulators, which changes the carrier densities and/or depletion widths of the junctions. The chicanes 313 may comprise delay elements with a longer waveguide path to provide further phase difference between the arms of the demux 305.

The coupling sections 315 comprise regions of the waveguides 303 in close proximity that allow the cross-coupling of optical signals between the adjacent waveguides and close the interferometer comprising the phase modulators 311, the chicanes 313, and the coupling sections 315.

In operation, WDM signals may be coupled into a photonics IC via the PSGC 301 and communicated to the demux 305 via the waveguides 303. The control modules 309 may provide a configurable bias to modify the phase of optical signals traveling through each arm of the demux 305. The chicanes 313 may provide further phase delay for optical signals traveling through them and the coupling sections 315 may be operable to couple the phase-delayed signals between the arms in the demux.

The photodetectors 307 may receive the coupled optical signals and generate an output electrical signal proportional the amplitude of the wavelength of light at which the photodetector is sensitive. Since signals of different wavelength reach the photodetectors 307 at different times, the different WDM signals may be extracted, or demultiplexed.

In some instances, depending on the polarization of the light signal received at the PSGC 301, the amplitude of the light signal in one branch of the waveguides 303 out of the PSGC 301 may be very low, e.g., when the polarization of the incoming light signal does not overlap with the polarization axis of the particular PSGC gratings for that branch. In this case, with such a low signal, the control modules 309 may not be able to maintain a constant bias of the demux 305.

FIG. 4 illustrates a WDM demux with amplitude scrambler, in accordance with an example embodiment of the disclosure. Referring to FIG. 4, there are shown PSGC 301, amplitude scrambler 401, demux 305, and photodetectors 307.

The amplitude scrambler 401 may comprise a control module 409, phase modulators 411, and coupling section 415. The phase modulators may comprise sections of p-n junctions in the waveguides 303 such that the phase of optical signals traveling through them may be modulated by changing the bias on the phase modulators. The control module 409 may sweep the amplitude vs. time in the branches, to ensure a minimum average optical power in each branch of the demux 305 over time.

The sweep time constant may be sufficiently fast compared to DEMUX control system. The sweep range, via interference at the coupling section 415 may be sufficiently large to meet optical power threshold criteria of the demux control. In one embodiment, the splitting enabled by the amplitude scrambler 401 does not have to be equivalent between output arms, as all light is recombined at far end photodetectors 307.

Example advantages of the amplitude scrambler 401 are that it: removes the need for a precise polarization recombiner, may need only a finite/limited range in phase tuning elements, may be incorporated in a single stage, reuses much of the MZI control algorithms, removes the need for most control elements as its function is enabled without taps or monitor photodiodes, and exhibits high immunity to imbalances and imperfections as all light still arrives at the photodetectors 307.

The demux 305 may be substantially similar to the demux 305 described with respect to FIG. 3, for example, but while a MZI demux is shown in FIG. 4, the amplitude scrambler 401 may be used with any demux scheme that utilizes active tuning/calibration. For example, a ring based demux and tuned AWG types may be incorporated with the amplitude scrambler.

In operation, WDM signals may be coupled into a photonics IC via the PSGC 301 and communicated to the demux 305 through the amplitude scrambler 401 via the waveguides 303. The control modules 309 may provide a configurable bias to modify the phase of optical signals traveling through each arm of the demux. The chicanes 313 may provide further phase delay for optical signals traveling through them and the coupling sections 315 may be operable to couple the phase-delayed signals between the arms in the demux.

The photodetectors 307 may receive the coupled optical signals and generate an output electrical signal proportional to the amplitude of the wavelength of light at which the photodetector is sensitive. Since signals of different wavelength reach the photodetectors 307 at different times, the different WDM signals may be extracted, or demultiplexed.

The control module 409 may configure the bias of the phase modulators 411, e.g., sweeping the voltage, such that when the signals are coupled at the coupling section 415, the optical signal intensity in each arm of the waveguides 303 extending into the demux 305 is non-zero. In an example scenario, the average optical power may be kept above a threshold level in each arm of the demux 305. If the average optical power is below the threshold level, the control modules 309 may latch high/low or may fluctuate uncontrollably, meaning the control modules 309 may not function to demultiplex incoming signals.

Figure 5:
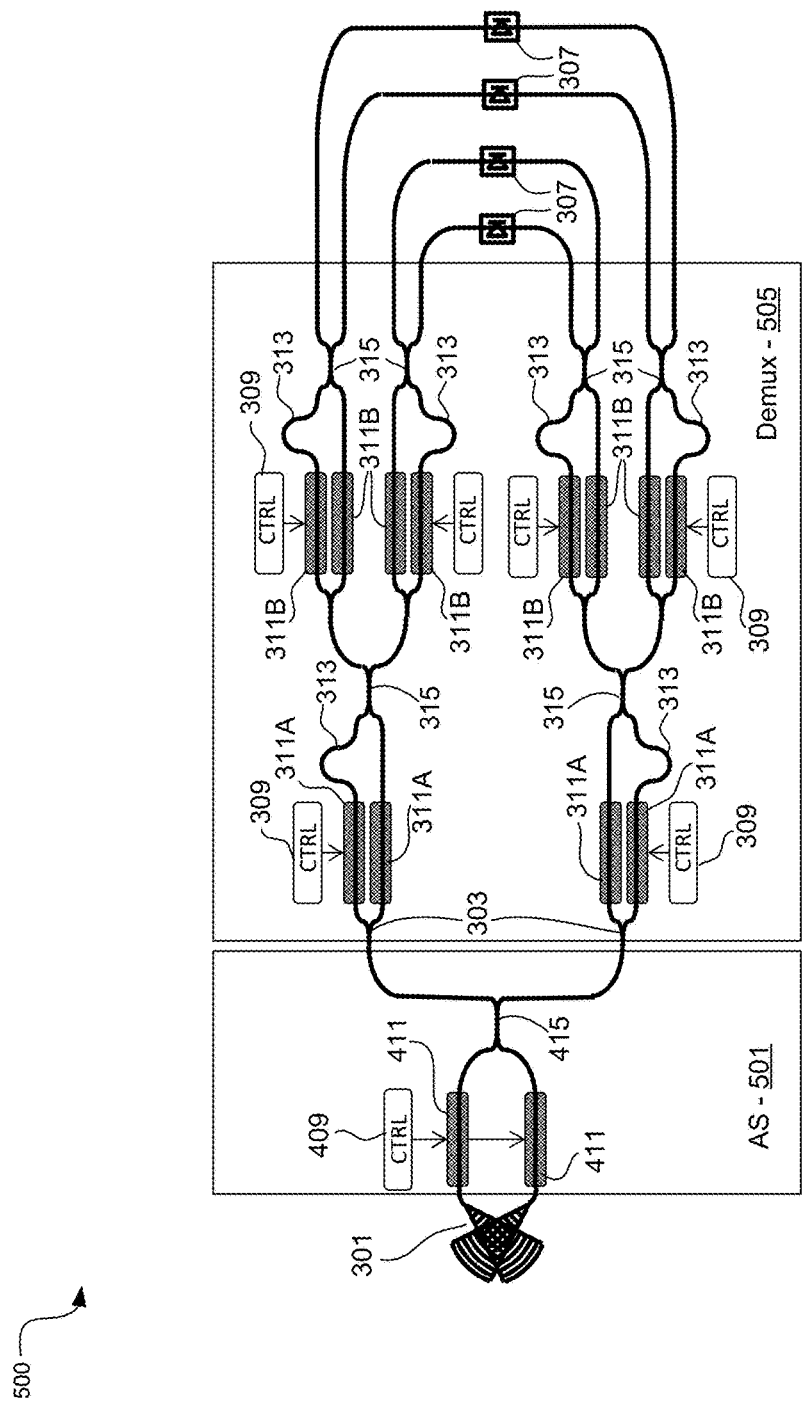
FIG. 5 illustrates a multi-channel WDM demultiplexer with an amplitude scrambler, in accordance with an example embodiment of the disclosure.

FIG. 5 illustrates a multi-channel WDM demux with amplitude scrambler, in accordance with an example embodiment of the disclosure. Referring to FIG. 5, there is shown PSGC 301, amplitude scrambler 501, demux 505, and photodetectors 307.

The amplitude scrambler 501 may comprise control module 409, phase modulators 411, and coupling section 415. The phase modulators may comprise sections of p-n junctions in the waveguides 303 such that the phase of optical signals traveling through them may be modulated by changing the bias on the phase modulators. The control module 409 may sweep the amplitude vs. time in the branches, to ensure a minimum average optical power in each branch of the demux 305 over time.

The demux 505 comprises a first pair of phase modulators 311A and a second set of four pairs of phase modulators 311B. The first pair of phase modulators 311A may modulate the phase of incoming optical signals of two wavelengths such that the two pairs of phase modulators 311B following the first pairs may modulate four wavelengths of incoming optical signals.

In the example shown in FIG. 5, the demux 505 comprises four output branches to four photodetectors 307 with two input branches from the amplitude scrambler. As with the example shown in FIG. 4, the amplitude scrambler 501 configures the optical power such that neither output has an average optical power below a threshold level, below which the control modules 309 may be unable to control.

In an example embodiment, a method and system are disclosed for a polarization immune wavelength division multiplexing demultiplexer. In this regard, aspects of the disclosure may comprise an optoelectronic transceiver an input coupler, a demultiplexer, and an amplitude scrambler, where the transceiver is operable to: receive at least two input optical signals of different polarization via the input coupler, communicate the at least two input optical signals to the amplitude scrambler via two waveguides, configure the average optical power in each of the two waveguides utilizing the amplitude scrambler, and demultiplex the at least two optical signals utilizing the demultiplexer. The amplitude scrambler may comprise phase modulators and a coupling section.

The phase modulators may comprise sections of P-N junctions in the two waveguides. The demultiplexer may comprise a Mach-Zehnder Interferometer. The demultiplexed signals may be received utilizing at least two photodetectors. The input coupler may comprise a polarization splitting grating coupler. The average optical power may be configured above a threshold value that is an optical power level above which demultiplexer control circuitry is able to control the demultiplexer to process incoming optical signals. The transceiver may comprise an optoelectronic transceiver in a silicon photonically-enabled integrated circuit. The silicon photonically-enabled integrated circuit may be in a single complementary-metal oxide semiconductor (CMOS) die. The silicon photonically-enabled integrated circuit may be in two CMOS die, where a first die comprises electronic devices and a second die comprises optical devices.

In another example embodiment, aspects of the disclosure may comprise a transceiver comprising a polarization splitting grating coupler (PSGC), a demultiplexer, and an amplitude scrambler, where the transceiver is operable to: receive at least two input optical signals of different polarization via the PSGC, communicate the at least two input optical signals to the amplitude scrambler via two waveguides, configure the average optical power in each of the two waveguides utilizing the amplitude scrambler; and demultiplex the at least two optical signals utilizing the demultiplexer.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for optical communication, the method comprising:
    in a transceiver having a demultiplexer and an amplitude scrambler, the amplitude scrambler comprising a plurality of phase modulation sections coupled to outputs of the amplitude scrambler via at least two waveguides with the outputs of the amplitude scrambler directly coupled to inputs of the demultiplexer:
    receiving at least two modulated input optical signals at the amplitude scrambler;
    configuring an average optical power in each of the at least two waveguides utilizing the amplitude scrambler; and
    demultiplexing the at least two modulated optical signals utilizing the demultiplexer.

2. The method according to claim 1, wherein the amplitude scrambler comprises phase modulators and a coupling section.

3. The method according to claim 2, wherein the phase modulators comprise sections of P-N junctions in the at least two waveguides.

4. The method according to claim 1, wherein the demultiplexer comprises a Mach-Zehnder Interferometer.

5. The method according to claim 1, comprising receiving the demultiplexed signals utilizing at least two photodetectors.

6. The method according to claim 1, comprising receiving the modulated input optical signals via a polarization splitting grating coupler.

7. The method according to claim 1, wherein the average optical power is configured above a threshold value that is an optical power level above which demultiplexer control circuitry is able to control the demultiplexer to process incoming optical signals.

8. The method according to claim 1, wherein the transceiver comprises an optoelectronic transceiver in a silicon photonically-enabled integrated circuit.

9. The method according to claim 8, wherein the silicon photonically-enabled integrated circuit is in a single complementary-metal oxide semiconductor (CMOS) die.

10. The method according to claim 8, wherein the silicon photonically-enabled integrated circuit is in two CMOS die, a first die comprising electronic devices and a second die comprising optical devices.

11. A system for communication, the system comprising:
    a transceiver comprising a demultiplexer and an amplitude scrambler, the amplitude scrambler comprising a plurality of phase modulation sections coupled to outputs of the amplitude scrambler via two or more waveguides with the outputs of the amplitude scrambler directly coupled to inputs of the demultiplexer, the transceiver being operable to:
    receive at least two modulated input optical signals at the amplitude scrambler;
    configure an average optical power in each of the at least two waveguides utilizing the amplitude scrambler; and
    demultiplex the at least two modulated input optical signals utilizing the demultiplexer.

12. The system according to claim 11, wherein the amplitude scrambler comprises phase modulators and a coupling section.

13. The system according to claim 11, wherein the phase modulators comprise sections of P-N junctions in the two waveguides.

14. The system according to claim 11, wherein the demultiplexer comprises a Mach-Zehnder Interferometer.

15. The system according to claim 11, wherein the transceiver is operable to receive the demultiplexed signals utilizing at least two photodetectors.

16. The system according to claim 11, wherein the modulated input signals are received via a polarization splitting grating coupler.

17. The system according to claim 11, wherein the average optical power is configured above a threshold value, and wherein the threshold value is an optical power level above which demultiplexer control circuitry is able to control the demultiplexer to process incoming optical signals.

18. The system according to claim 11, wherein the transceiver comprises an optoelectronic transceiver in a silicon photonically-enabled integrated circuit in a single complementary-metal oxide semiconductor (CMOS) die.

19. The system according to claim 11, wherein the transceiver comprises an optoelectronic transceiver in a silicon photonically-enabled integrated circuit in two CMOS die, a first die comprising electronic devices and a second die comprising optical devices.

20. A system for communication, the system comprising:
    a transceiver comprising a polarization splitting grating coupler (PSGC), an amplitude scrambler, and a demultiplexer, the demultiplexer comprises a plurality of phase modulation sections coupled to outputs of the amplitude scrambler via at least two waveguides with the outputs of the amplitude scrambler directly coupled to inputs of the demultiplexer, the transceiver being operable to:
    receive at least two modulated input optical signals via the PSGC;

configure an average optical power in each of the at least two waveguides utilizing the amplitude scrambler; and demultiplex the at least two modulated input optical signals utilizing the demultiplexer.

* * * * *